United States Patent [19]

Jefferies

[11] Patent Number: 5,064,584
[45] Date of Patent: Nov. 12, 1991

[54] ROTARY MOLDING MACHINE

[75] Inventor: Frederick W. Jefferies, Algonquin, Ill.

[73] Assignee: Weidenmiller Company, Elk Grove Village, Ill.

[21] Appl. No.: 407,804

[22] Filed: Sep. 14, 1989

[51] Int. Cl.[5] .............................................. B29C 33/30
[52] U.S. Cl. ....................................... 264/39; 264/219; 425/183; 425/188; 425/194; 425/220; 425/362
[58] Field of Search ....................... 264/219, 39, 297.6, 264/299; 425/183, 188, 193, 194, 362, 363, 367, 220; 384/58

[56] References Cited

U.S. PATENT DOCUMENTS

| | | | |
|---|---|---|---|
| 1,939,362 | 12/1933 | Patt | 425/194 |
| 2,235,492 | 3/1941 | Weidenmiller | 425/362 |
| 2,666,399 | 1/1954 | Pereyra | 425/194 |
| 3,416,466 | 12/1968 | Weidenmiller | 425/187 |
| 3,469,540 | 9/1969 | Werner | 425/362 |
| 4,155,691 | 5/1979 | Ridgeway et al. | 425/220 |
| 4,306,847 | 12/1981 | Rollins | 425/362 |
| 4,362,754 | 12/1982 | Wenger et al. | 425/362 |

Primary Examiner—Jay H. Woo
Assistant Examiner—James P. Mackey
Attorney, Agent, or Firm—Hill, Van Santen, Steadman & Simpson

[57] ABSTRACT

A rotary molding apparatus has a die roll and a split clamping pillow block structure of self-centering structure supporting the opposite shaft ends of the die roll. The split pillow block has a pivotally mounted portion and a device for locking that portion when the die roll is in operation. A feed roller is mounted on upright arms which are urged toward the die roll. The arms carry doctor blade structure between the feed roller and the die roll and the doctor blade is biased toward the die roll. A fluent material supply hopper cooperates with the feed roller and there is a guide structure for effecting movement of the hopper between the feed roller cooperation position and a backed-off position. A magazine is provied for storing a plurality of die rolls and a mechanism is provided for selecting any die roll from the magazine and for transporting such die roll from the magazine into working position in the pillow blocks and for selectively returning the die roll to the magazine.

12 Claims, 10 Drawing Sheets

FIG. 3
FIG. 4
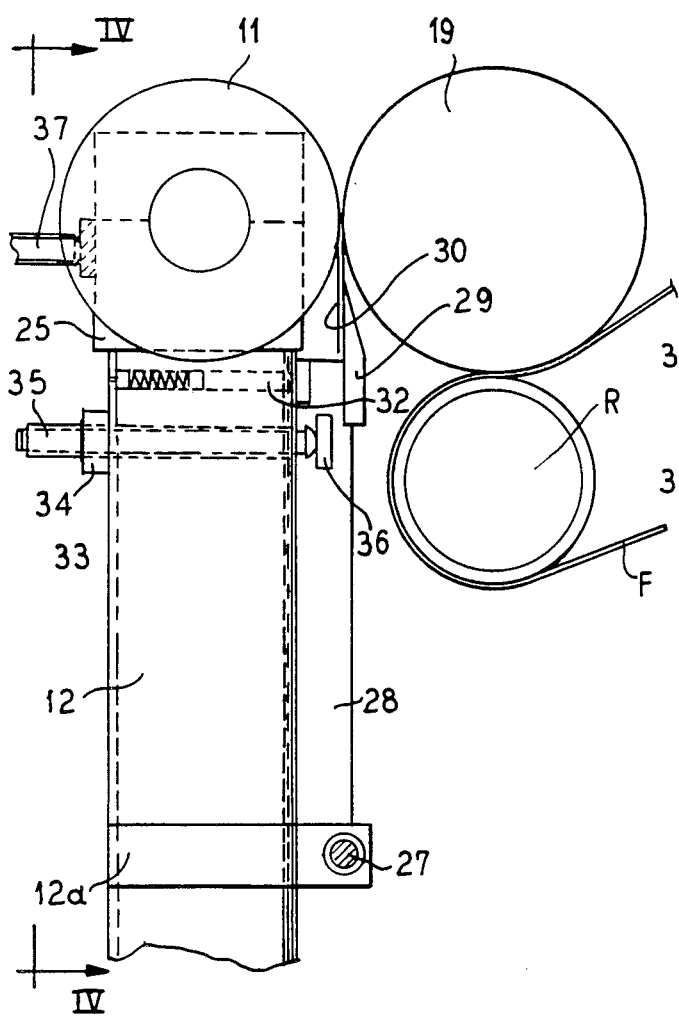
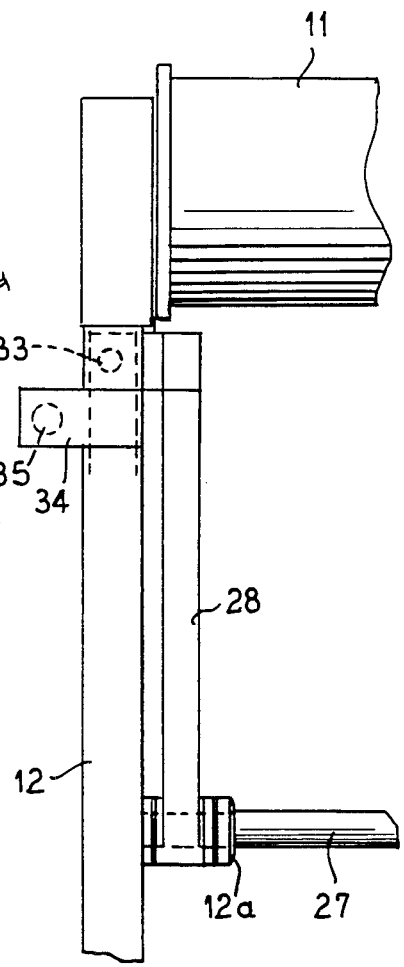

ROTARY MOLDING MACHINE

BACKGROUND OF THE INVENTION

The present invention relates to new and improved rotary molding apparatus and method, and is more particularly concerned with apparatus of this kind especially suitable for molding cookies and confections.

In apparatus of the kind indicated, as principal component, is the die roll which has inscribed in the surface thereof the particular pattern desired for the articles to be produced. Because of the wide range of patterns for articles to be produced by the rotary die rolls, mounting of the rolls must be interchangeable in the machine. Heretofore, a fairly involved manual operation has been necessary to effect roll changes. Generally in effecting roll changes bolted split bearings have had to be opened, the fluent material hopper had to be tilted away from the roll assembly, the doctor blade dropped away from the die roll, for the purpose of freeing the die roll to be hoisted from the machine and then by reverse action loading into position a replacement roll.

SUMMARY OF THE PRESENT INVENTION

An important object of the present invention is to provide a new and improved means and method for simplified mounting and replacement for die rolls in rotary molding apparatus.

Another object of the invention is to provide new means and method for magazine storage and selective handling of the rolls relative to the operating position in the machine.

A further object of the invention is to provide new and improved bearing mechanism for die rolls in rotary molding apparatus.

Still another object of the invention is to provide new and improved means for shifting of the feed roller and the die roll doctor blade relative to the die roll.

It is a further object of the invention to provide a new and improved means and method for accurately mounting the die roll in a rotary molding machine.

It is also an object of the invention to provide new and improved means and method for clamping the die roll, the moldable material hopper, the feed roll and doctor blade assembly in position.

BRIEF DESCRIPTION OF THE DRAWINGS

Other objects, features and advantages of the present invention will be readily apparent from the following detailed description of representative embodiments thereof, taken in conjunction with the accompanying drawings, although variations and modifications may be effected without departing from the spirit and scope of the novel concepts embodied in the disclosure, and in which:

FIG. 3 is an enlarged fragmentary sectional elevational detail view taken substantially in the plane of line III—III in FIG. 2.

FIG. 4 is a fragmentary sectional elevational detail view taken substantially in the plane of line IV—IV in FIG. 3.

DETAILED DESCRIPTION

Figure 1:
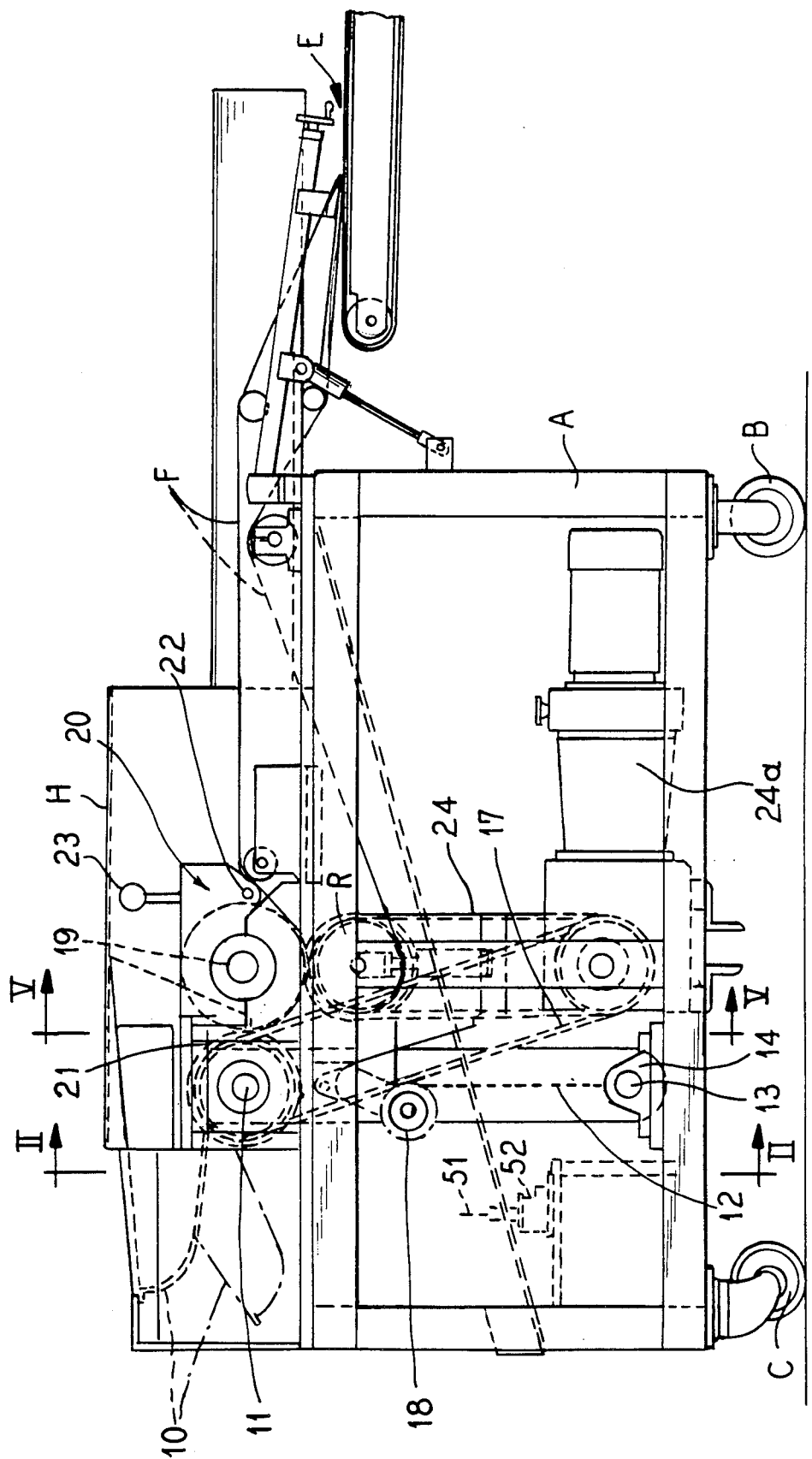
FIG. 1 is a side elevational view of a rotary molding apparatus embodying features of the present invention.
Figure 5:
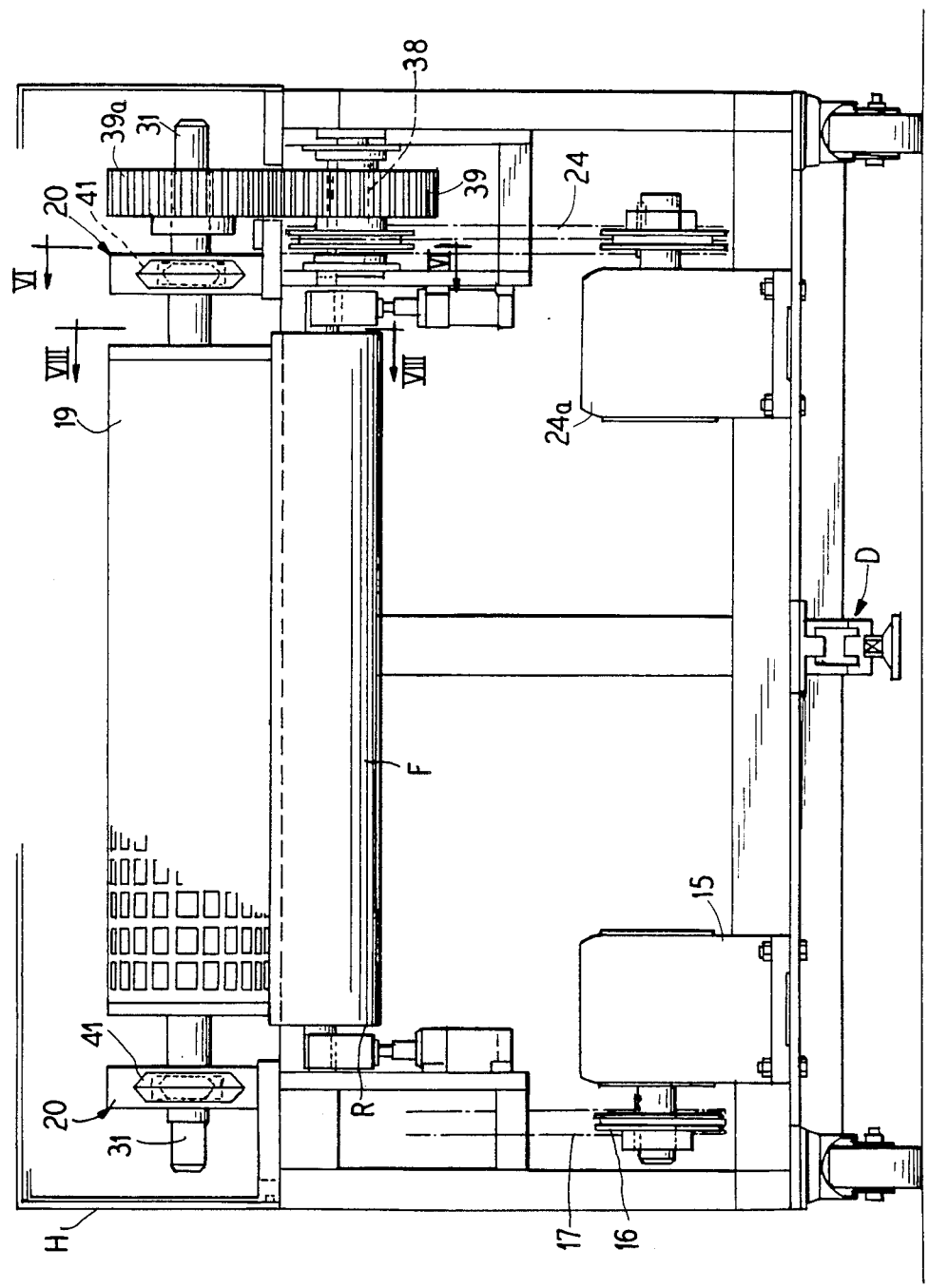
FIG. 5 is a vertical sectional elevational detail view taken substantially in the plane V—V in FIG. 1.

Referring to FIG. 1, rotary molder apparatus comprises a unit including a supporting frame A desirably mounted on casters B and C and provided with vertically operable holding stop means D (FIG. 5).

Supported on the frame A is a fluent moldable material hopper 10 which supplies the material such as cookie dough by way of a feed roll 11 mounted on a pair of generally upright arms 12 pivoted at their lower ends on a bearing shaft 13 carried by bearing blocks 14 supported on the frame A. The feed roller 11 is driven by means of an electrical motor 15 (FIG. 5) reduction gear means through a sprocket drive 16 and chain 17, the chain being tensioned by means of a tensioning wheel or sprocket 18.

A die roll 19 has shaft means carried in bearing means such as pillow blocks comprises housings 20 supported on the frame A and which are secured by locking pin bars 21. The bearing housings are split and pivoted at 22 and can be rotated through 90° manually as by means of a knob 23, or by automatic linkage (See FIG. 6). Rotary driving of the die roll 19 is by means of a vertical chain drive 24 (FIGS. 1 and 5) operated from a gear box 24a driven by a suitable motor. A molded article takeoff conveyor system E associated with the die roll 19 is also shown as carried by the support means frame A. The articles are molded in an array of machined, e.g. engraved, cavities 19a (FIG. 7) in the surface of the die roll 19 and transferred from the cavities to a transfer belt F which is trained over a roll R pressing the belt into takeoff relation to the die roll in a customary manner. A suitable protective cabinet enclosure cover for the machine may be supported on the frame A.

Figure 2:
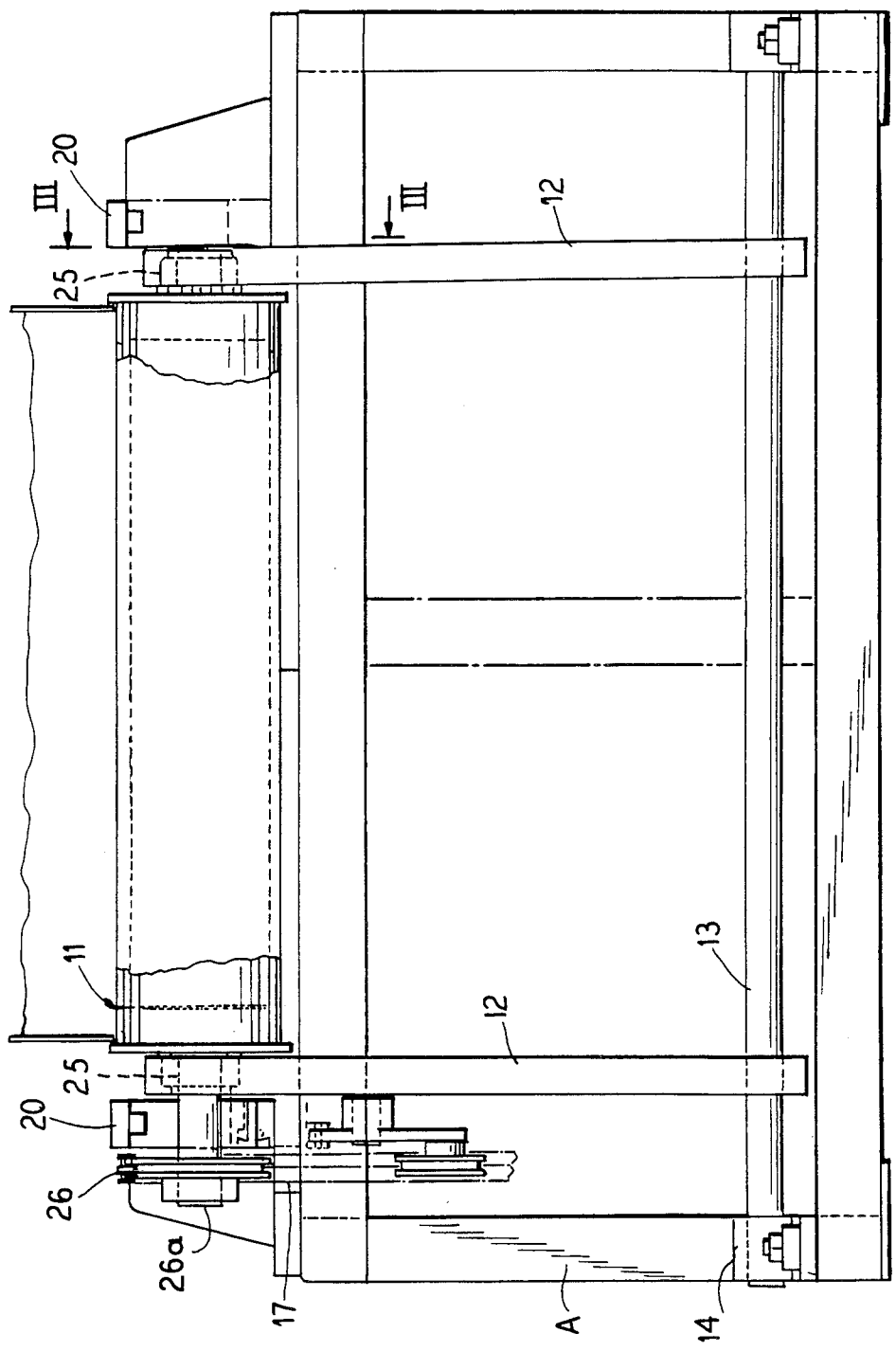
FIG. 2 is an elevational view taken substantially in the plane of line II—II in FIG. 1.

As shown in FIG. 2, the feed roller 11 is mounted on bearings 25 carried by the arms 12, a sprocket 26 being attached to a stub shaft 26a, the sprocket having the drive chain 17 trained thereover.

As shown in FIGS. 3 and 4, a bracket 12a fixed to the inside of each of the arms 12 carries a bearing spindle 27 to which a doctor blade arm 28 is mounted. A doctor blade backing plate 29 mounted on the arms 2 carries doctor blade 30 extending up between the roller 11 and the die roll 19 and which is pressed against the die roll 19 by means of a push rod 32 biased by means of a compression spring 33. A stop plate 34 carries a stop screw 35 which locks the respective arm 12 against stop plate 36 on the doctor blade arm 28, and moves to the right and is adjustable. Another stop screw 37 locks the arm 12 which cannot then move inadvertently in either direction, but is rockably adjustable in both directions for adjustment when larger or smaller die rolls 19 are mounted for operation.

As shown in FIG. 5, the drive for the die roll 19 comprises a lay-shaft 38 and a drive gear 39 which drives a die roll gear 39a mounted on stub shaft 31 of the die roll.

Figure 6:
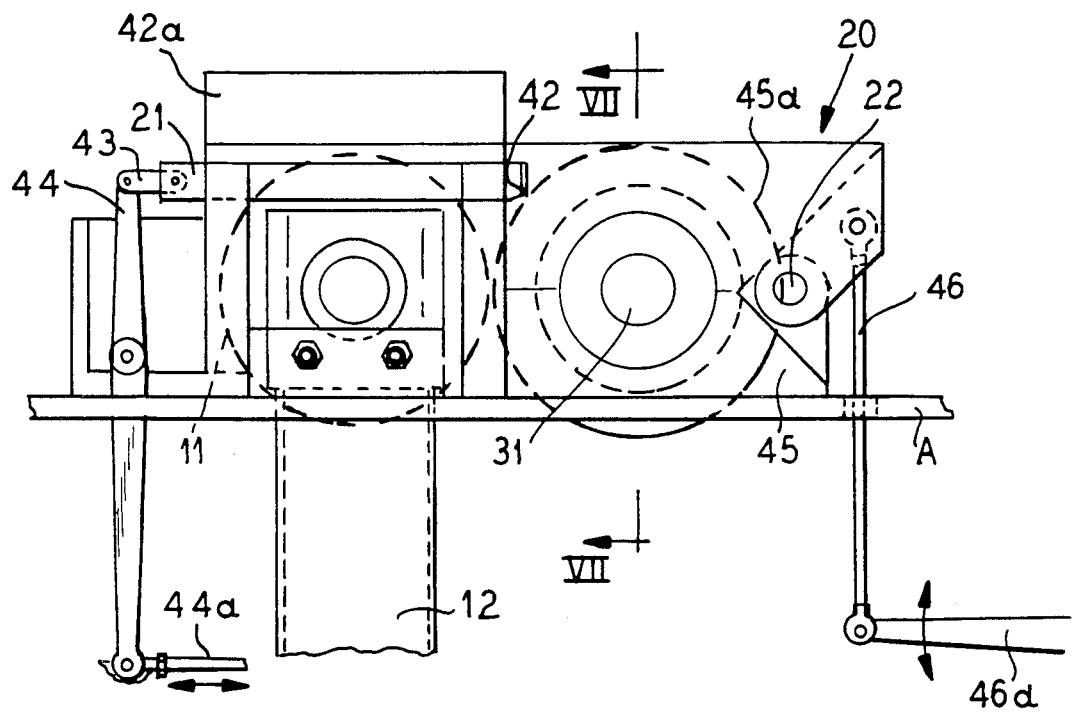
FIG. 6 is an enlarged fragmentary sectional elevational detail view taken substantially in the plane of line VI—VI in FIG. 5.
Figure 7:
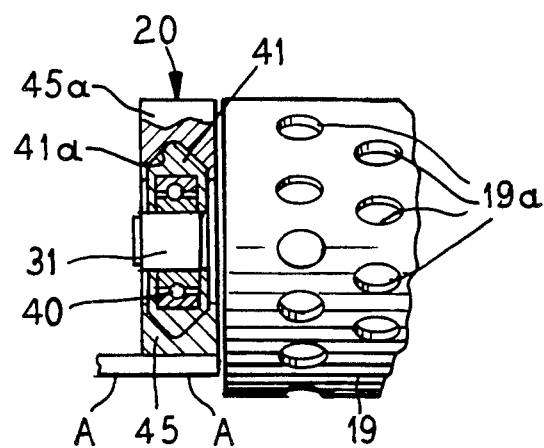
FIG. 7 is a fragmentary sectional detail view taken substantially in the plane of line VII—VII in FIG. 6.

In FIGS. 6 and 7 details concerned with new and improved generally self-aligning bearing structure for the die roll 19 is disclosed. Each opposite end stub shaft 31 of the roll is fitted with a bearing means 40 enclosed in a split hardened housing 41 which is of annular generally triangular or V-cross section providing a peripheral rim complementary to a gripping annular channel surface 41a in the pillow block means 20 comprising a lower upwardly facing portion 45 mounted fixedly on a portion of the frame A, and an upper complementary downwardly facing portion 45a pivotally mounted at 22 to the pillow block portion 45. Thereby, the upper pillow block portion 45a is adapted to be rocked into and out of bearing housing gripping clamping engagement by means of a linkage 46 operated by a suitable lever arm 46a connected with appropriate drive means (not shown). For retaining the portion 45a of the pillow block against displacement during operation of the roll 19, the lock pin or bar 21 is engageable in a socket 42. The pin 21 is reciprocably mounted in a guide block 42a. Means for reciprocably operating the pin 21 between locking and unlock positions comprises a linkage 43, 44 operable by suitable means including a reciprocal actuator 44a.

Figure 10:
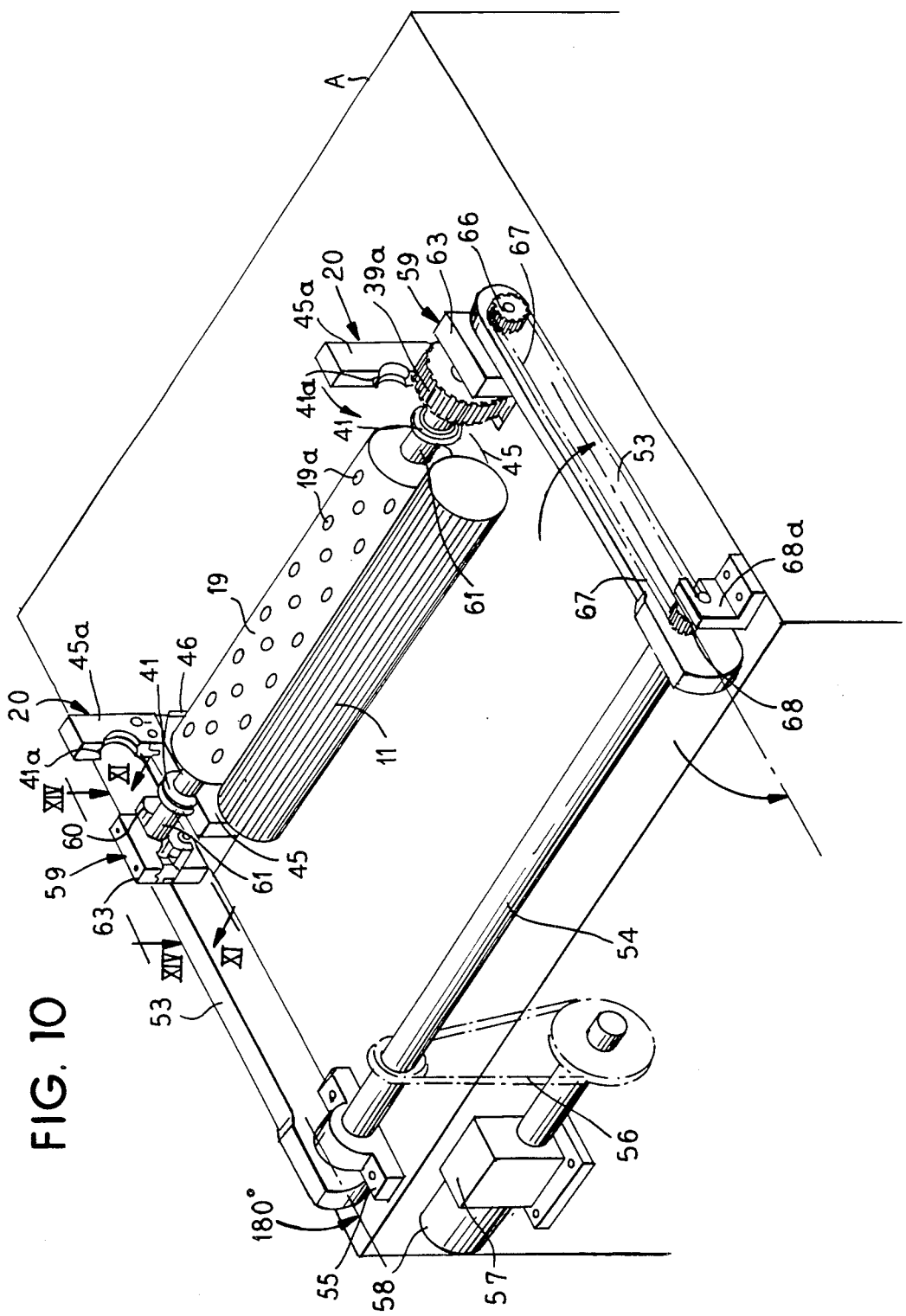
FIG. 10 is a schematic top elevational view of the machine of FIG. 1 showing details of a die roll handling mechanism.
Figure 11:
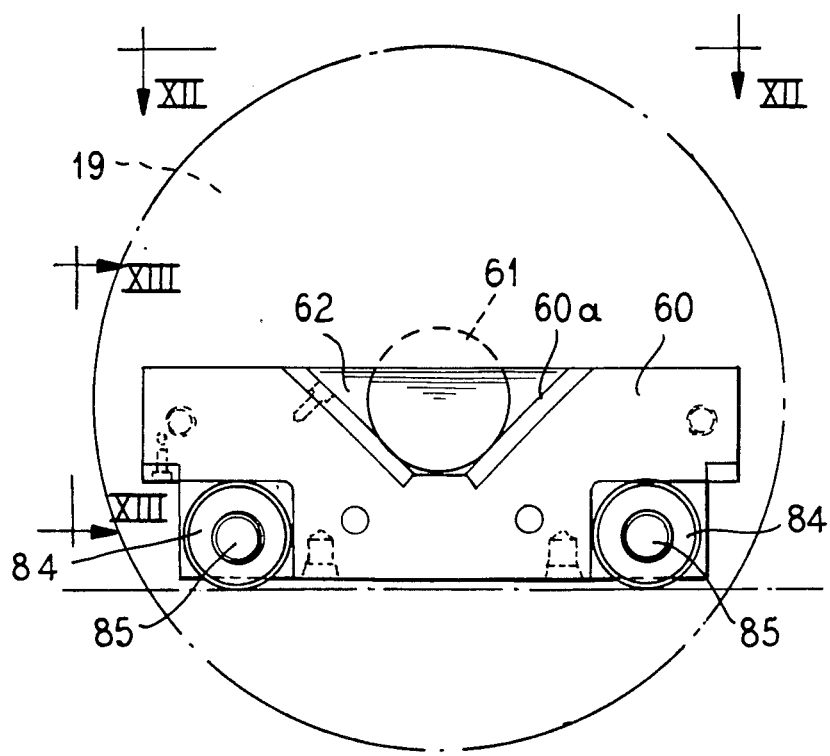
FIG. 11 is an enlarged fragmentary detail view taken substantially in the plane of line XI—XI in FIG. 10.
Figure 12:
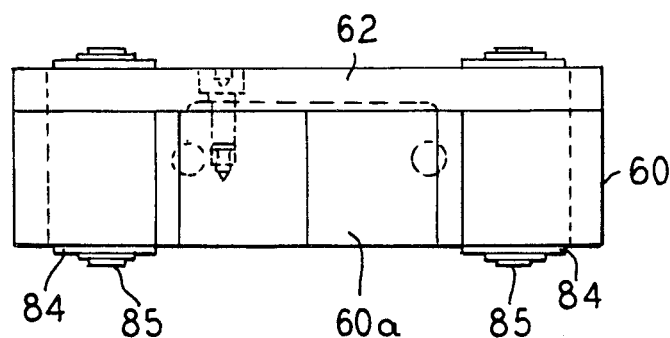
FIG. 12 is a fragmentary detail plan view taken substantially in the plane of line XII—XII in FIG. 11.
Figure 13:
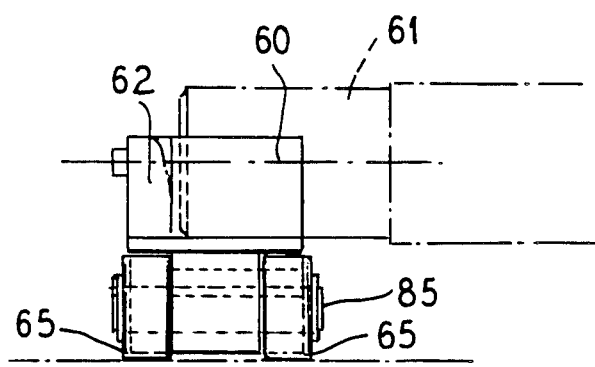
FIG. 13 is a fragmentary sectional elevational detail view taken substantially along the line XIII—XIII in FIG. 11.

When the die roll 19 is to be mounted, the locking pin 21 is retracted, and the upper bearing block portion 45a is swung approximately 90° upwardly substantially as shown in FIG. 10, and the die roll is loaded into place whereafter the block portion 45a is returned to the position shown in FIG. 6 and the locking pin 21 driven into locking position. In this orientation the die roll 19 is positively located accurately in its operating position by virtue of the self-centering angular design of the split bearing housing 41 in cooperating with the complementary retaining surface 41a.

Figure 8:
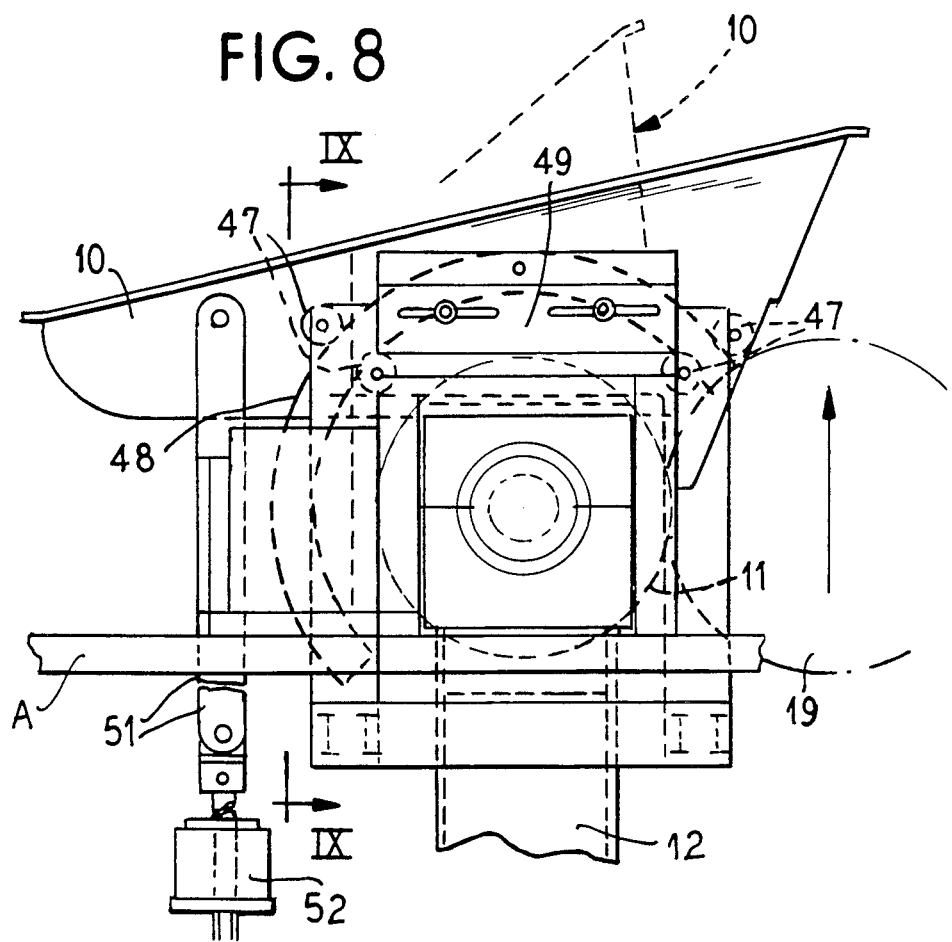
FIG. 8 is an enlarged fragmentary sectional elevational detail view taken substantially in the plane of line VIII—VIII in FIG. 5.
Figure 9:
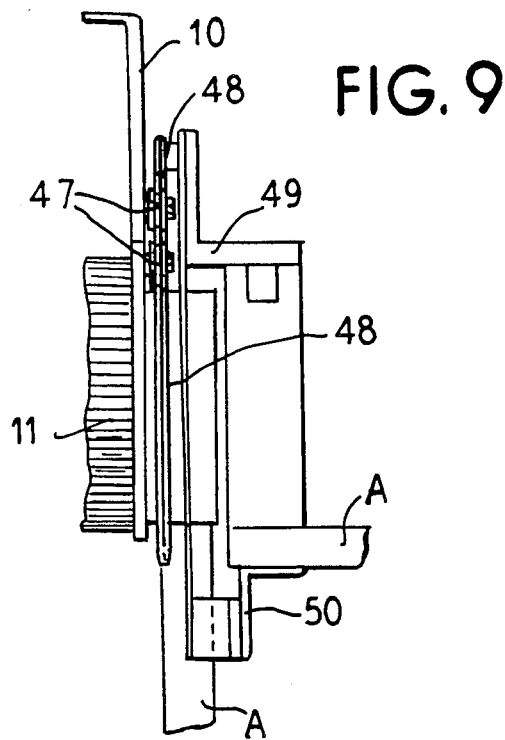
FIG. 9 is a sectional elevational detail view taken substantially in the plane of line IX—IX in FIG. 8.

FIGS. 8 and 9 depict details of the mechanism for mounting and operating the supply hopper 10. Along its opposite sides the hopper 10 has follower rollers 47 which engage with an arcuate track means 48 at each side of the hopper, so that the hopper can be swung into and out of registration with the feed roller 11. For this purpose, the track means 48 comprise bars which are mounted fixedly to brackets 49 carried by the frame A. For stabilizing the lower end of each of the tracks 48, a respective bracket 50 is carried by the part of the frame A to which the mounts for the brackets 49 are attached. For swinging the hopper 10 between its complementary feeding relation to the feed roller 11, as shown in full outline in FIG. 8, and its open or raised position as shown in dash outline, means comprising an operating link 51 connected at its upper end to the hopper 10 is connected at its lower end to a drive means such as a powered screw jack 52. Through this arrangement, the hopper 10 is arranged to be swung clear of the feed roller 11 to an extent necessary to provide adequate clearance for maneuvering the die roll 19 into and out of its operating position.

Figure 16:
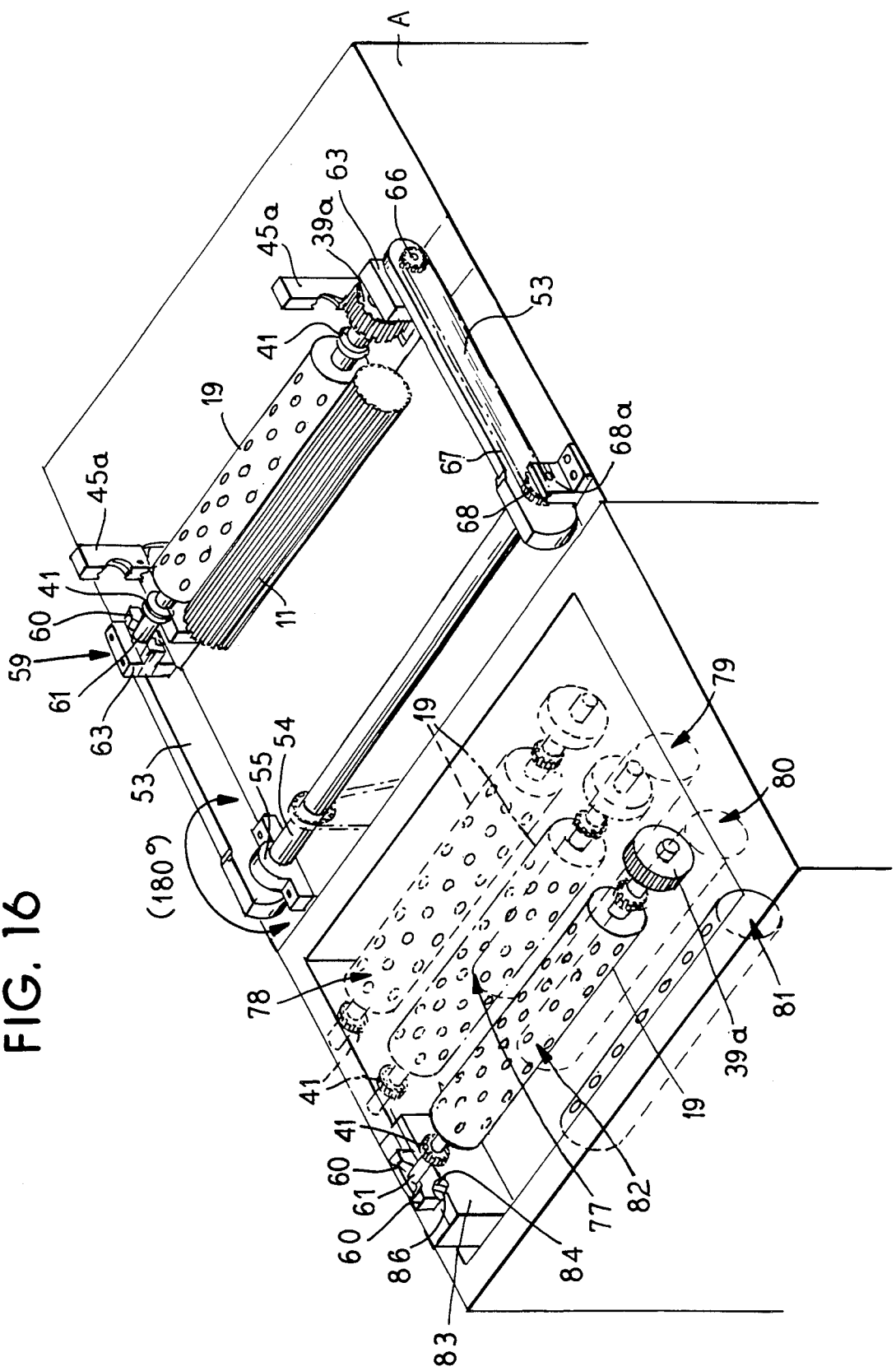
FIG. 16 is a schematic top perspective view of the rotary molding machine and die roll magazine and die roll transfer mechanism.

In the more or less schematic view in FIG. 10, means are shown to facilitate loading and unloading the die roll 19 with relation to its operating position on the rotary molder frame A. For this purpose a loading die roll arm manipulating assembly is provided comprising a pair of suitably spaced swingably mounted arms 53 which are fixedly mounted at their butt ends to a swing shaft 54 mounted rotatably in bearing or pillow blocks 55. The shaft 54 is arranged to be oscillatably driven by drive means 56 such as a flexible drive member which may be a drive belt or sprocket chain operated from a reduction gear box 57 driven by an electric motor 58. The drive means is adapted to rotate the shaft 54 through an 180° arc between a die roll unloading and a die roll loading position (FIG. 16).

For handling the die roll 19, each of the arms 53 is equipped with a roll carrier transporter head structure 59 which carries a vee block carriage 60 (FIGS. 10-13) that is arranged to receive and locate extreme stub shaft ends 61. The respective die roll stub shafts 61 are adapted to be received in the respective vee cradle 60a of the blocks 60 each of which has a hardened chamfered back plate 62 by which the end of the associated stub shaft 61 is maintained in proper axial orientation within the vee block cradles.

Figure 14:
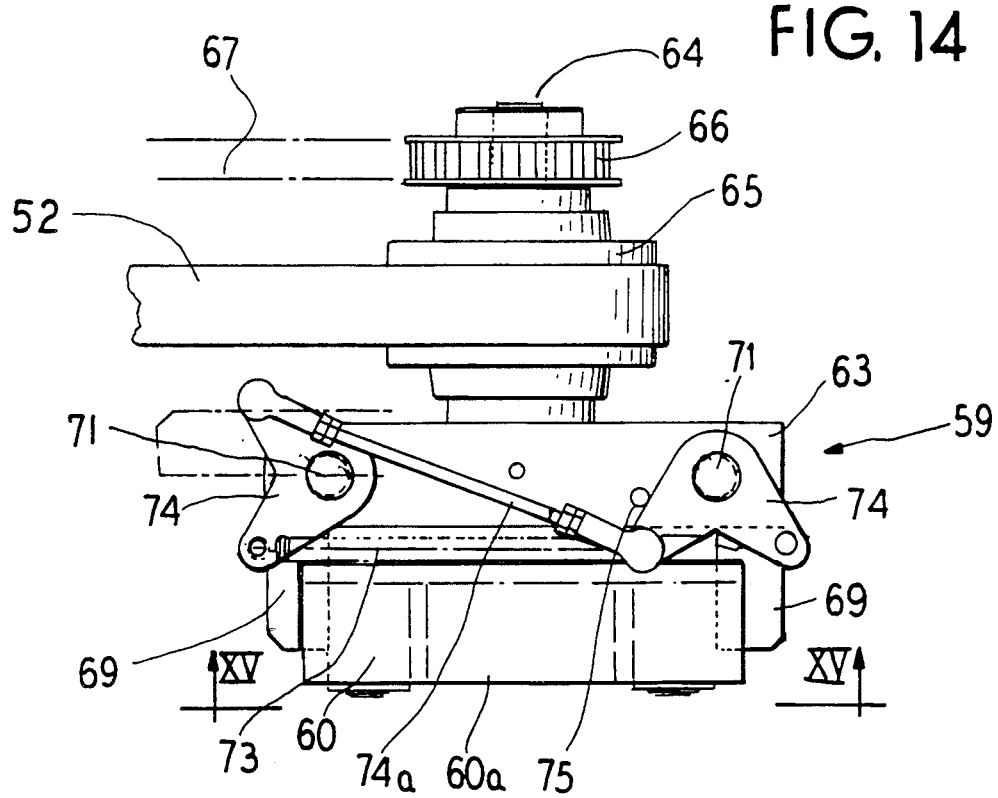
FIG. 14 is a fragmentary enlarged top plan view taken substantially in the plane of line XIV—XIV in FIG. 10.
Figure 15:
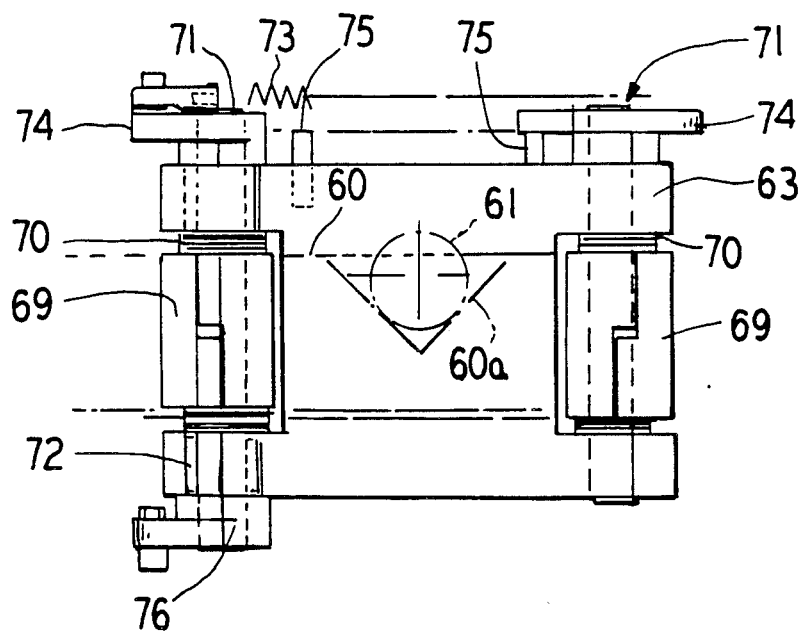
FIG. 15 is a side elevational view taken substantially in the plane of line XV—XV in FIG. 14.

The arrangement is such that the arms 53 can transfer any one of a plurality of selected die rolls 19 between a magazine M (FIG. 16) and the working position on the frame A of the rotary die molding machine. For this purpose, referring to FIG. 14, there is provided in the head structure 59 of each arm 53 a head block 63 which is mounted to a bearing spindle 64 housed in flange bearings 65 and carried by the associated end of the loading arm 53. A rotary timing wheel 66 and a flexible drive means such as a chain or belt 67 control the head unit in a horizontal orientation during the 180° rotation movement of the associated arm 53 from a fixed timing wheel 68 carried by a bracket 68a (FIG. 10) which always maintains the head unit in the desired horizontal orientation.

Two lever support blocks 69 (FIG. 14, 15) mounted on thrust bearings and having spindles 71 and needle bearings 72 are sprung together by tension spring 73 acting on pivoted yokes 74 fixed to the spindles 71 and controlled by a connecting rod 74a against stop pins 75. The blocks 69 are adapted to be activated for closing together by cam action mechanism in a receiving opening in the die roll feeder magazine M acting on a roller lever 76.

As shown in FIG. 16, the magazine M may be a separate unit attached to the frame A, or may, if preferred be an extension integral with the frame A. Although the arms 53 are shown as mounted at their butt ends on the frame A adjacent to the magazine M, they may as well be mounted on the adjacent top portion of the magazine M.

As shown in FIG. 16, the magazine M has a storage capacity for six of the die rolls 19, but it can be extended to any number desired. Each of the die rolls rests on its vee-block carriers 60 in the magazine. The die rolls 19 may be selectively indexed in a clockwise direction circuit and locked in stationary position on the indexing mechanism of the magazine. As shown, the rolls 19 may assume successive positions wherein the roll in phantom which had been in position 77 may be the one selected to be mounted in the molding machine and shown in full line therein, and the roll returned by the arms 52 may now be at the position 78. The roll in position 78 is then dropped down by a jacking mechanism which lowers this die roll into position 79 from which it then may be indexed along fixed rails inside the cabinet of the magazine into positions 80, then 81 and then lifted up to position 82 by another jacking mechanism such as depicted at 83.

To facilitate the transfer between the operating position and the magazine position, each of the vee carriage blocks 60 (FIGS. 11 to 13 and 16) has a set of bearing rollers 84 mounted on bearing spindles 85. Thereby the vee blocks 60 which stay with the respective die rollers 19 are adapted to be readily indexed in the jacking mechanism members 83 which have respective suitably chamfered receiving recesses 86 for this purpose.

It will be understood that variations and modifications may be affected without departing from the spirit and scope of the novel concepts of the present invention.

I claim as my invention:

1. A rotary molding apparatus comprising, in combination:
   support means for supporting said apparatus;
   a die roll having shaft means for enabling rotation of said die roll at its opposite ends and mounting bearing means for engaging with said shaft means comprising respective pillow blocks, each of said pillow blocks having a first portion carried by said support means and a complementary second portion pivotally mounted for clamping engagement with the first portion, said pillow block portions having generally V-shaped cross section matching annular clamping cavities and said shaft means having respective complementary generally V-shaped cross section bearing members engaged in said cavities;
   means for locking said pivotal pillow block second portion against displacement in an operating mode of the die roll;
   a feed roller mounted on upright pivoted arms for supporting the feed roller in operative relation to the die roll, and means for adjusting the position of the arms pivotally, and thereby adjusting the position of the feed roller relative to the die roll;
   said arms carrying means for providing a doctor blade projecting between the feed roller and the die roll, and means for biasing the means for providing a doctor blade toward the die roll;
   a fluent material supply hopper cooperating in feeding relation with said feed roller, guide track means for guiding said hopper and carried by said support means, and follower means on said hopper for engaging said track means to allow movement of said hopper between said feeding relation and a backed-off position, and means for effecting movement of the hopper along said track means between said feeding relation and the backed-off position;
   means carried by said support means for driving said die roll;
   means carried by said support means for driving said feed roller;
   a magazine for supporting a plurality of die rolls; and
   means for selecting said die roll from said magazine and for transporting said die roll from the magazine into working position in said pillow blocks and for selectively returning the die roll to the magazine.

2. Apparatus according to claim 1, wherein said magazine is located contiguous to said support means, and said means for selecting said die roll and for transporting said die roll are mounted on a part of said support means adjacent to said magazine.

3. Apparatus according to claim 1, wherein said selecting and transporting means comprises a pair of arms, means for swinging said arms between said magazine and said support means and for carrying said die roll by the opposite ends of the shaft means of the die roll.

4. A rotary molding apparatus comprising:
   support means for supporting said apparatus;
   a die roll having shaft means for enabling rotation of said die roll at opposite ends and mounting bearing means for engaging with said shaft means comprising pillow blocks each of which has a first portion carried by said support means and a complementary second portion pivotally mounted for clamping engagement with the first portion;
   said pillow block portions having generally V-shaped cross section matching annular clamping cavities; and
   said shaft means having complementary generally V-shaped cross section bearing members engaged in said cavities.

5. Apparatus according to claim 4, including means for locking said pivotal pillow block second portion against displacement.

6. A rotary molding apparatus comprising:
   support means for supporting said apparatus;
   a die roll having shaft means for enabling rotation of said die roll at opposite ends, and mounting bearing means carried by the support means for engaging with said shaft means;
   a feed roller mounted on upright pivoted arms and means for adjusting the arms and thereby the feed roller relative to the die roll; and
   said arms carrying means for providing a doctor blade projecting between the feed roller and the die roll, and means for biasing the means for providing a doctor blade toward the die roll.

7. Apparatus according to claim 6, wherein said arms comprise a pair of generally upright arms having lower ends, and wherein said apparatus further comprises means for pivoting said arms at their lower ends.

8. A rotary molding apparatus comprising:
   support means for supporting said apparatus;
   a die roll having shaft means for enabling rotation of said die roll at opposite ends and bearing means on said support means for engaging with said shaft means;
   a magazine for supporting a plurality of die rolls; and
   means for selecting said die roll from said magazine and for transporting said die roll from the magazine into working position to said bearing means and for selectively returning the die roll to the magazine.

9. Apparatus according to claim 8, including cradle block means for carrying said die roll by said shaft means, said selecting and transporting means being releasably engageable with said cradle block means.

10. Apparatus according to claim 9, wherein said selecting and transporting means comprises pivotally mounted selector arms movable between said support means and said magazine and having carrying means for releasably engaging said cradle block means.

11. Apparatus according to claim 8, wherein said magazine has means for indexing said die rolls therein successively to facilitate selection of the die rolls.

12. A method of operating a rotary molding apparatus, comprising:

supporting a die roll on support means for supporting the apparatus and providing the die roll with shaft means for enabling rotation of said die roll at opposite ends and mounting bearing means for engaging said shaft means comprising pillow blocks each of which has a portion carried by said support means and a portion pivotally mounted for clamping engagement with the supported portion;

providing said pillow block portions with generally V-shaped cross section annular clamping cavities, providing said shaft means with complementary generally V-shaped cross section bearing members and engaging said bearing members in said cavities positioning the die roll on said support means;

locking said pivotal bearing portion against displacement in an operating mode when said bearing members are engaged in said cavities;

providing a feed roller mounted on upright arms and urging said feed roller toward the die roll;

providing on said arms means for providing a doctor blade between the feed roller and the die roll and biasing the means for providing a doctor blade toward the die roll;

providing a fluent material support hopper engaging with said feed roller and means carried by said support means for moving said hopper between an operating position engaging said feed roller and a backed-off position, whereby the supply hopper is moved between the feed roller engaging position and the backed-off position to provide clearance for the positioning of the die roll on said support means;

providing means on said support means for driving said die roll;

providing means carried by said support means for driving said feed roller;

providing a magazine for supporting a plurality of die rolls; and selecting said die roll from said magazine and shifting said die roll from the magazine into working position in said pillow blocks, whereby fluent material is molded during said operating mode and then returning the die roll to the magazine at the end of said operating mode.

* * * * *